United States Patent
Lindwurm et al.

(10) Patent No.: US 10,790,719 B2
(45) Date of Patent: Sep. 29, 2020

(54) STATOR FOR AN ELECTRICAL MACHINE HAVING AN INTERCONNECTION DEVICE FOR STATOR COILS, AND ELECTRICAL MACHINE HAVING A STATOR OF THIS KIND

(71) Applicant: ZF FRIEDRICHSHAFEN AG, Friedrichshafen (DE)

(72) Inventors: Roland Lindwurm, Sennfeld (DE); Christoph Wieder, Küps (DE); Jochen Wittmann, Burkardroth (DE); Ralf Rönnebeck, Schweinfurt (DE); Marcus Van Heyden, Dittelbrunn (DE); Alexander Schäflein, Ochsenfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 340 days.

(21) Appl. No.: 16/067,974

(22) PCT Filed: Dec. 8, 2016

(86) PCT No.: PCT/EP2016/080208
§ 371 (c)(1),
(2) Date: Jul. 3, 2018

(87) PCT Pub. No.: WO2017/118516
PCT Pub. Date: Jul. 13, 2017

(65) Prior Publication Data
US 2019/0006905 A1    Jan. 3, 2019

(30) Foreign Application Priority Data

Jan. 8, 2016    (DE) .................. 10 2016 200 115

(51) Int. Cl.
*H02K 3/52* (2006.01)
*H02K 1/14* (2006.01)
(Continued)

(52) U.S. Cl.
CPC ............. *H02K 3/522* (2013.01); *H02K 1/146* (2013.01); *H02K 1/278* (2013.01); *H02K 3/38* (2013.01); *H02K 2203/09* (2013.01)

(58) Field of Classification Search
CPC .......... H02K 3/522; H02K 3/38; H02K 1/146; H02K 1/278; H02K 2203/09
See application file for complete search history.

(56) References Cited

U.S. PATENT DOCUMENTS 6,489,567 B2 * 12/2002 Zachrai .................. H02G 5/025
174/149 B
2010/0045134 A1    2/2010 Ciampolini et al.
(Continued)

FOREIGN PATENT DOCUMENTS

CN    203 933 206    11/2014
DE    199 20 127     11/2000
(Continued)

*Primary Examiner* — Jue Zhang
(74) *Attorney, Agent, or Firm* — Cozen O'Connor

(57) ABSTRACT

A stator of an electric machine has an annular stator lamination stack at which stator coils with coil ends are arranged by winding bodies and are interconnected with an interconnection device that has a plurality of connection conductors arranged coaxially to one another and which are electrically insulated from one another by insulating layers. The connection conductors have coil connection regions for the coil ends and power connection regions for supplying power to the electric machine (10). The connection conductors are annular disks and are arranged in an axially staggered manner at the stator. Each connection conductor has at least one fastening portion for fastening to the stator and a winding body has at least one connection area. The fastening portions of the connection conductors are arranged to overlap one another, and the connection conductors are fastened along with them to the connection area of the winding body.

15 Claims, 11 Drawing Sheets

(51) Int. Cl.
*H02K 1/27* (2006.01)
*H02K 3/38* (2006.01)

(56) References Cited

U.S. PATENT DOCUMENTS

| | | | | |
|---|---|---|---|---|
| 2013/0106250 | A1* | 5/2013 | Kanada | B60L 58/21 |
| | | | | 310/67 R |
| 2014/0014390 | A1 | 1/2014 | Chamberlin | |
| 2014/0015359 | A1* | 1/2014 | Chamberlin | H02K 3/522 |
| | | | | 310/71 |
| 2016/0301277 | A1* | 10/2016 | Nowak | H02K 1/146 |
| 2017/0093239 | A1* | 3/2017 | Teranishi | H02K 3/18 |
| 2018/0316236 | A1* | 11/2018 | Ikura | H02K 3/50 |

FOREIGN PATENT DOCUMENTS

| | | |
|---|---|---|
| DE | 10 2011 107022 | 4/2012 |
| DE | 10 2014 211 923 | 12/2015 |
| FR | 3 018 964 | 9/2015 |
| JP | 2009 290921 | 12/2009 |
| WO | WO 2011/108734 | 9/2011 |
| WO | WO 2014/136496 | 9/2014 |
| WO | WO 2014/057978 | 9/2016 |

* cited by examiner

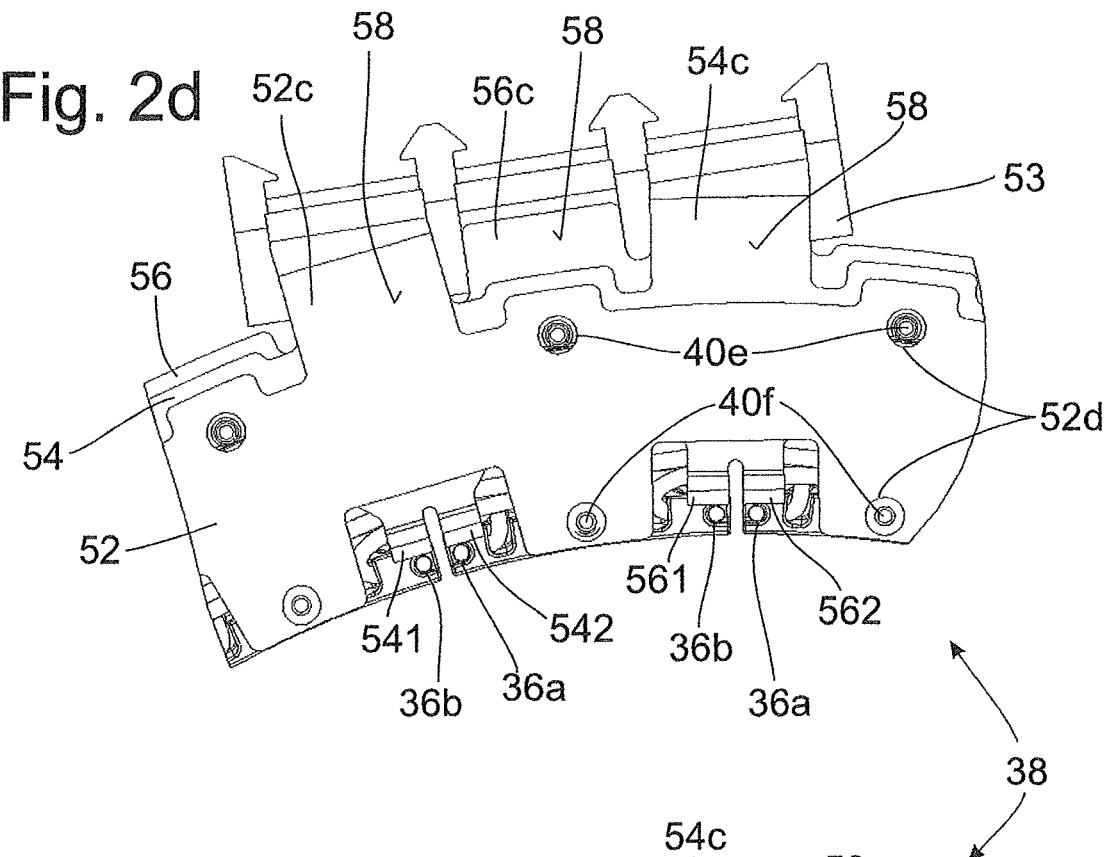
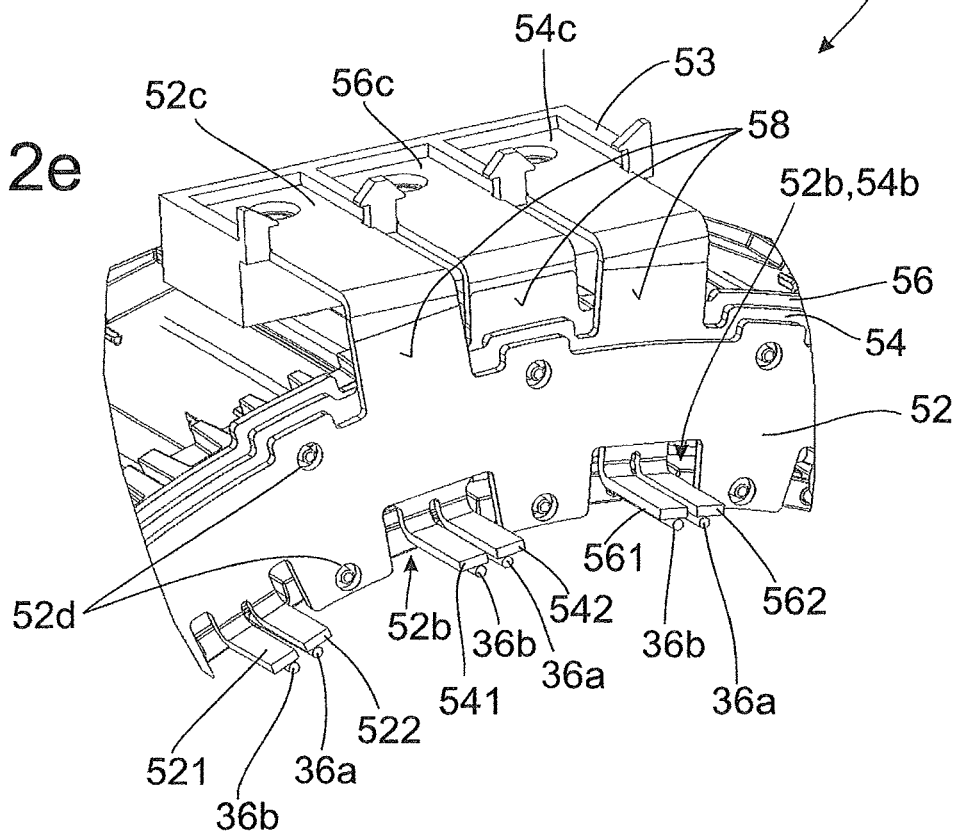

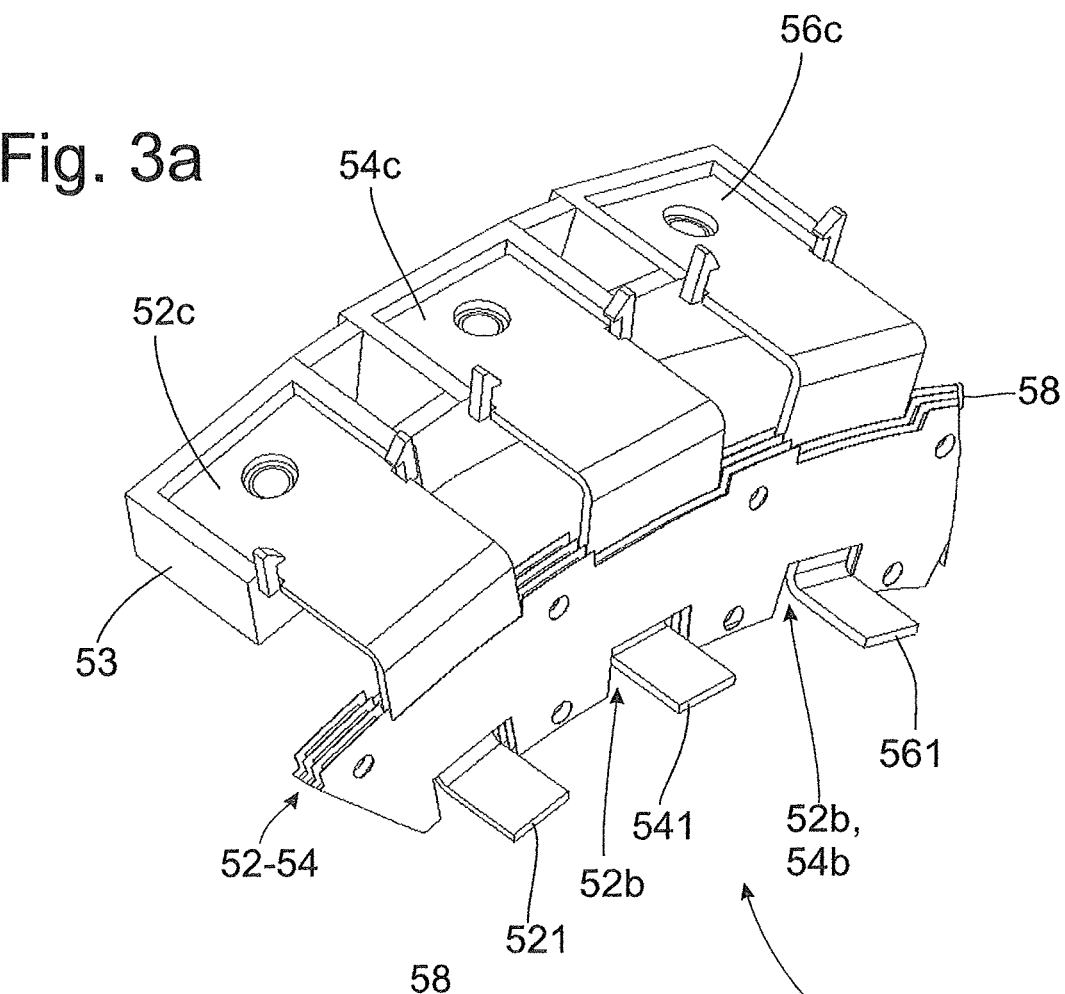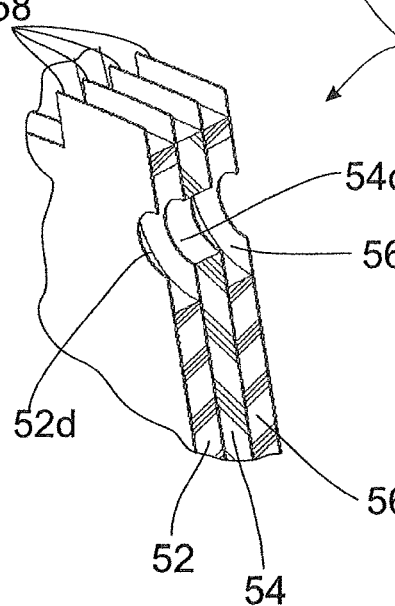

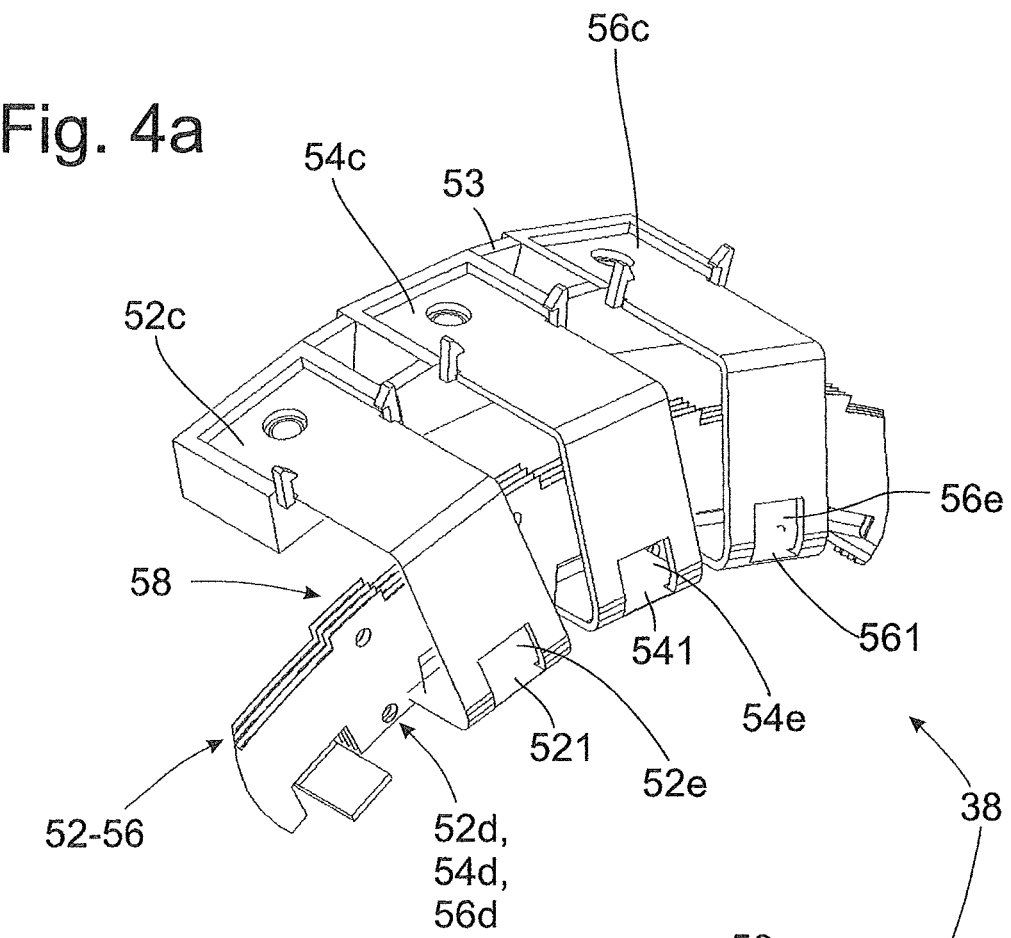
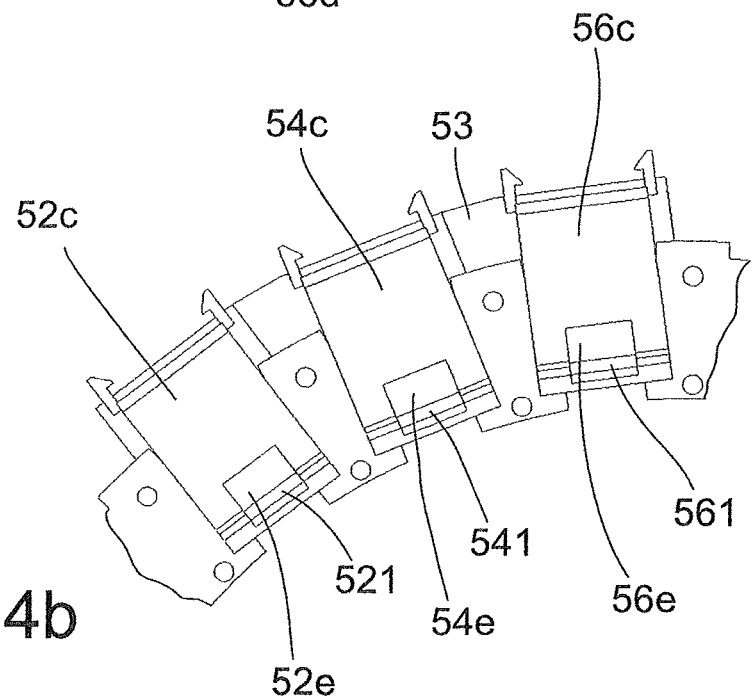

STATOR FOR AN ELECTRICAL MACHINE HAVING AN INTERCONNECTION DEVICE FOR STATOR COILS, AND ELECTRICAL MACHINE HAVING A STATOR OF THIS KIND

CROSS REFERENCE TO RELATED APPLICATIONS

This is a U.S. national stage of application No. PCT/EP2016/080208, filed on Dec. 8, 2016. Priority is claimed on German Application No. DE102016200115.9, filed Jan. 8, 2016, the content of which is incorporated here by reference.

BACKGROUND OF THE INVENTION

1. Field of the Invention

The present invention is directed to a stator of an electric machine with an interconnection device for stator coils and to an electric machine.

2. Description of the Prior Art

In a generic stator known from DE 199 20 127 C2, an interconnection device comprising a plurality of concentric connection conductors is arranged inside a space defined by the stator coils, and the connections for the coil ends are formed as connection extensions at the connection conductors. The individual connection conductors are fastened to a front side of the stator lamination stack via an insulating layer formed as insulating disk.

SUMMARY OF THE INVENTION

It is an object of one aspect of the present invention to provide a stator of an electric machine of the type indicated above and an electric machine of this kind with an interconnection device for the stator coils which is simple to produce, economizes on installation space and is easy to assemble.

A stator of an electric machine is accordingly proposed that has an annular stator lamination stack at which a quantity of stator coils with coil ends is arranged by winding bodies and which has an interconnection device for the stator coils arranged at the stator lamination stack on the front side. The interconnection device has a plurality of connection conductors arranged coaxial to one another and which are electrically insulated from one another by insulating layers, and the connection conductors have coil connection regions for the coil ends and power connection regions for supplying power to the electric machine. The stator is characterized in that the connection conductors are constructed as annular disks and are arranged in an axially staggered manner at the stator. Each connection conductor has at least one fastening portion for fastening to the stator and a winding body has at least one connection area. The fastening portions of the connection conductors are arranged so as to overlap one another, and the connection conductors are fastened together with these fastening portions to the connection area of the winding body.

As a result of the mutual alignment of the fastening portions of the connection conductors, the latter are overlaid at the same time such that the coil connection regions provided in predetermined circumferential intervals at the connection conductors are oriented corresponding to the coils and coil ends thereof arranged in a circular shape at the stator lamination stack. Accordingly, when the connection conductors are stacked prior to arranging at the stator lamination stack, a relative alignment of the connection conductors with respect to one another is effected. The absolute rotational position of the connection conductors and interconnection device relative to the stator coils is then fixed in a simple manner in that the fastening portions which are brought into register with one another are associated with the connection areas provided at the winding bodies of the stator coils. A simple and definite positional association of the connection conductors with the stator coils is provided in this way without requiring further elements such as an additional support for the connection conductors.

Further, an axially compact arrangement is made possible in that the connection conductors are formed as annular disks, particularly from a strip-shaped or plate-shaped copper semifinished product. The fastening portions of the connection conductors may be formed as simple recesses which are brought into register with one another axially when the annular conductors are stacked and which cooperate in each instance with a connection area of a winding body. The winding bodies are usually made of a plastic, in particular an injection-moldable plastic, so that corresponding connection areas in the form of retaining clamps, catch connections, grooves, etc. can easily be formed at the plastic. Pins protruding in axial direction from the winding bodies can serve, for example, as connection areas for cooperating with the above-mentioned recesses, and the connection conductors can be fitted to the pins individually or already pre-stacked, and the pins hold the connection conductors permanently and undetachably, for example, by a subsequent thermal deformation.

According to an advantageous configuration, a winding body can have a winding area formed by a winding carrier and two legs which define the winding area in axial direction and are connected to the winding carrier. The connection area can be formed at a leg at which the connection conductors can be arranged axially or radially with respect to the winding area. To this end, the connection area can be formed, for example, as a radial and/or axial extension at one leg or at both legs corresponding to a predefined position of the connection conductors.

The insulating layer can advantageously be formed as a self-adhesive insulating paper or a self-adhesive insulating foil. As a result of the mutual adhesion, the connection conductors and the insulating layers required therebetween are associated with one another in a fixed and undetachable manner so that loose elements are avoided and the interconnection device of the stator can be produced in a more controlled manner. A double-sided or one-sided adhesive paper, a foil, for example, Kapton foil, an aramid paper or Nomex paper or plastic disks can be used for insulation. In this way, a connection conductor and an insulating layer or all of the connection conductors and the insulating layers which are arranged therebetween and possibly also on the two outwardly facing end faces or plane faces can form a common pre-produced element.

Alternatively, the connecting rings for forming an insulating layer can also be coated with a plastic that covers the two end faces and at least one radially inner or outer circumferential surface of a connection conductor.

A radial extension of the insulating layer usually approximately corresponds to the radial extension of an associated connection conductor. Voltage breakdowns and, therefore, unwanted short circuits can occur at the radially inner or radially outer edge areas of the connection conductors. In order to increase the dielectric strength, an air gap and creepage distance of the connection conductors which are at a different electric potential can be increased in that two adjacent connection conductors are arranged in a radially overlapping manner or so as to be radially staggered relative to one another.

In this context, an individual insulating layer can be provided instead of two adjacent insulating layers, and this individual insulating layer is arranged between two adjacent, radially overlapping connection conductors and extends along the entire radial extension of the two radially overlapping connection conductors.

As an alternative to the above-mentioned step, adjacent connection conductors can also be formed with a radially corresponding extension, and an insulating layer arranged between these connection conductors extends beyond a radially inner and/or radially outer edge area of these connection conductors and accordingly protrudes over the connection conductors. This also increases an air gap and creepage distance between the connection conductors. In an advantageous manner, economical carry-over parts can be used for the individual connection conductors and the insulating layers. The extent to which an insulator protrudes depends on the design of the electric machine and the required air gap and creepage distance and, for a stator of an electric drive motor for example, can amount to from about 0.5 mm to about 5 mm, preferably about 2 to 3 mm.

According to a further advantageous configuration, the coil connection regions of the connection conductors with the coil ends can be formed integral with the connection conductors as radially inwardly or outwardly projecting extensions which are axially bent for connecting the stator to the connection conductors and which can be arranged parallel to and adjacent to axially oriented coil ends. Further, the coil connection regions and the coil ends can be bent radially inward or outward from the axial position by a determined angle before or after being connected so that the interconnection device is made shorter in axial direction.

In order to make possible a comparatively short radial extension of the interconnection device, circumferentially spaced recesses can be provided at the axially staggered connection conductors, and respective coil connection regions of the further connection conductors can be guided axially through these recesses or can engage therein.

In order to make possible an automated manufacture of the stator, the coil ends can preferably be arranged on a common axial and radial position, and two circumferentially adjacent coil ends each of two coils each are associated with one and the same connection conductor. Instead of a shared coil connection region for these coil ends, the coil connection regions of these coils can be arranged so as to be spatially separated from one another, in particular by at least one slit. The advantage consists in that when fixing the coil ends to coil connection regions, a heat input required by a welding process or soldering process is reduced and the joint can be controlled more easily in technical respects relating to manufacture by singularizing the terminals. In addition, directly adjoining coil ends of this type are easier to decouple from oscillations and vibrations occurring in operation.

For connecting the electric machine to an external energy source, power connection regions can be provided at the stator. Like the coil connection regions, these power connection regions are formed integral with the connection conductors and are provided at these connection conductors in each instance as a radially inwardly projecting extension. In contrast to a radially outer arrangement, an inner area of the annular disks which would otherwise be left unused as waste can be utilized when the connection conductors are produced by stamping, and the overall radial extension of a semifinished product can be reduced. The power connection regions can be bent out of the disk plane so that their end regions can be guided to a position radially outward of the coils or axially adjacent to the coils and are available in this position for further electrical connection to an external power source.

Within the framework of a further embodiment form, an extension of a power connection region can simultaneously form a coil connection region at the connection conductors. A power connection region is formed for achieving sufficient current-carrying ability compared to a coil connection region with the same material thickness of the semifinished product, particularly a copper plate with a greater surface area, in particular with a greater width, which can lead to layout problems in this area of the stator owing to a very limited installation space. In this respect, a further advantage consists in that the power connection region can have an access window for contacting a coil end to the coil connection region.

In a further regard, the present invention is directed to an electric machine with a rotor and with a stator, wherein the stator has at least one of the above-mentioned features.

The invention will be described in the following by way of example referring to an embodiment form shown in the figures.

BRIEF DESCRIPTION OF THE DRAWINGS

The drawings show:
FIG. 2b is a perspective sectional view of the interconnection device from FIG. 2a;
FIG. 2c is an overall perspective view of the interconnection device from FIG. 2a;
FIG. 2d is a front partial view of a stator with an interconnection device from FIG. 2a;
FIG. 2e is a perspective partial view of the interconnection device from FIG. 2d;
FIG. 3a is a perspective partial view of an interconnection device with axially stacked connection conductors between which are arranged radially protruding insulating layers;
FIG. 3b is a perspective sectional view of the interconnection device from FIG. 3a;
FIG. 3c is an overall perspective view of the interconnection device from FIG. 3a;
FIG. 3d is a perspective partial view of a stator with an interconnection device from FIG. 3a;
FIG. 4a is a perspective partial view of an interconnection device with axially stacked connection conductors having power connection regions at their radially inner circumference;
FIG. 4b is a front partial view of the interconnection device from FIG. 4a;
FIG. 4c is an overall perspective view of the interconnection device from FIG. 4a.

DETAILED DESCRIPTION OF THE PRESENTLY PREFERRED EMBODIMENTS

Figure 1:
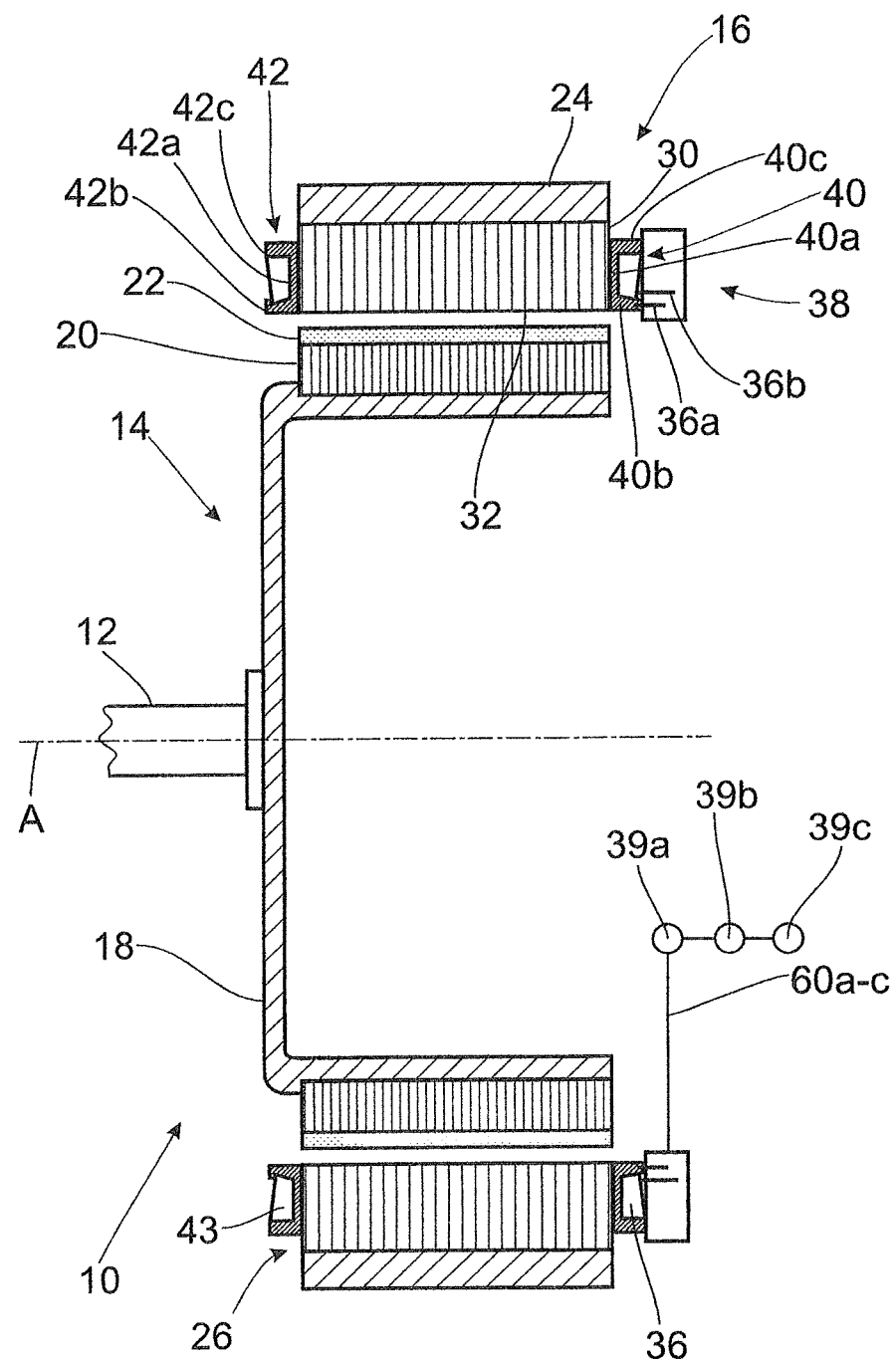
FIG. 1 is a schematic view of an electric machine with a stator and an interconnection device.
Figure 2A:
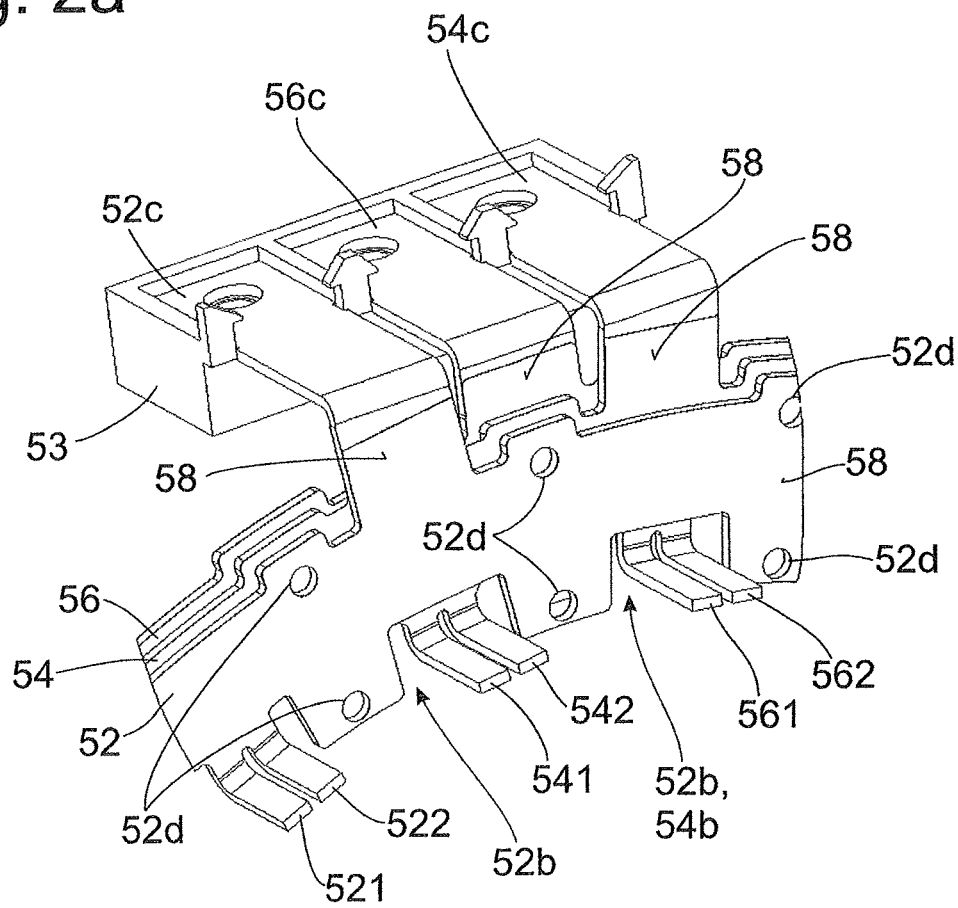
FIG. 2a is a perspective partial view of an interconnection device with connection conductors which are axially stacked and radially staggered with respect to one another.
Figure 2B:
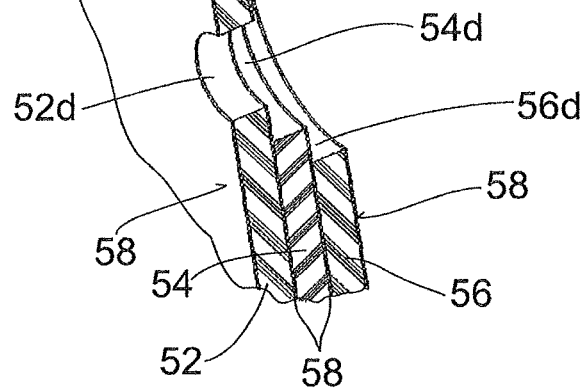
Figure 2C:
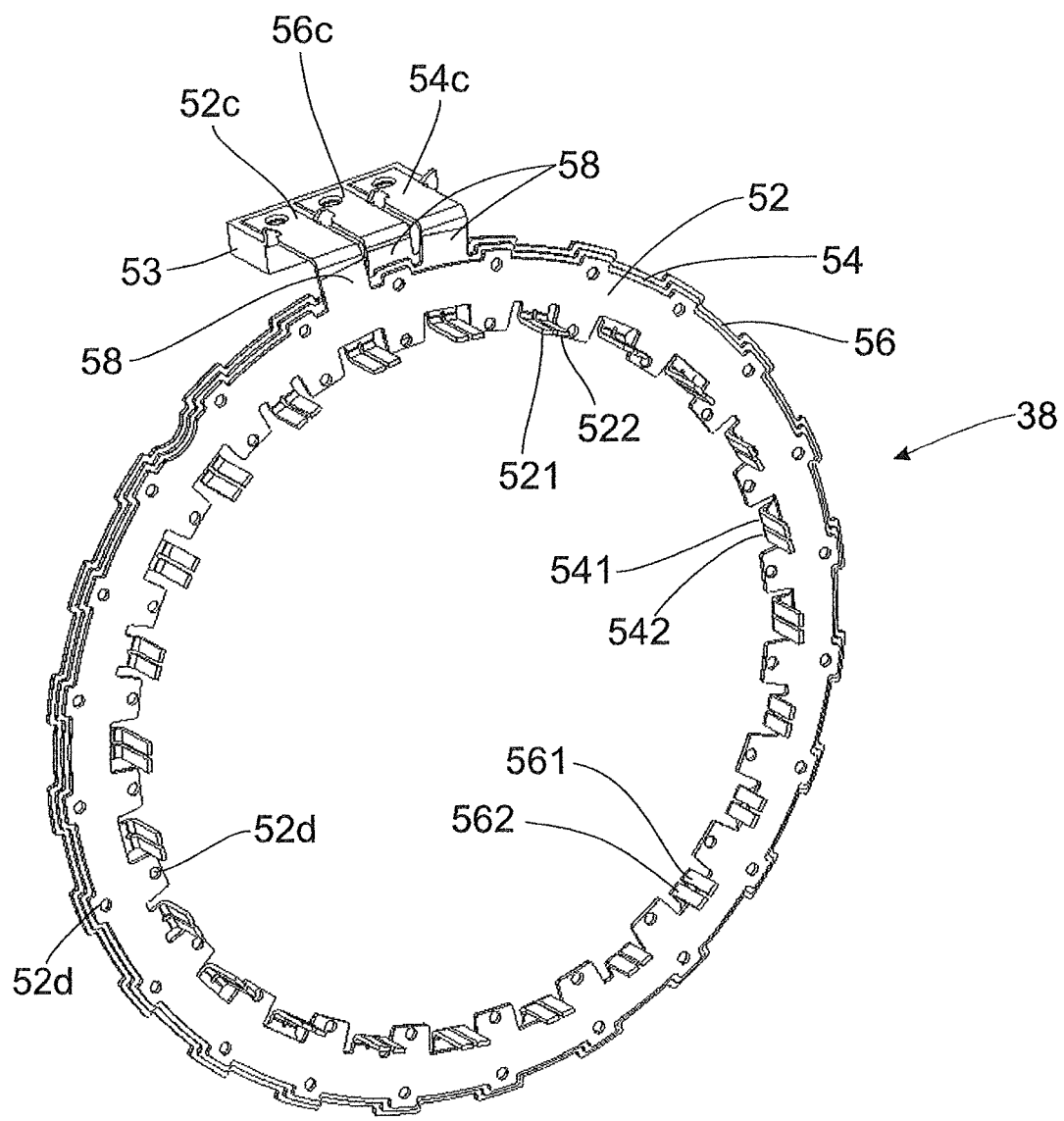
Figure 3C:
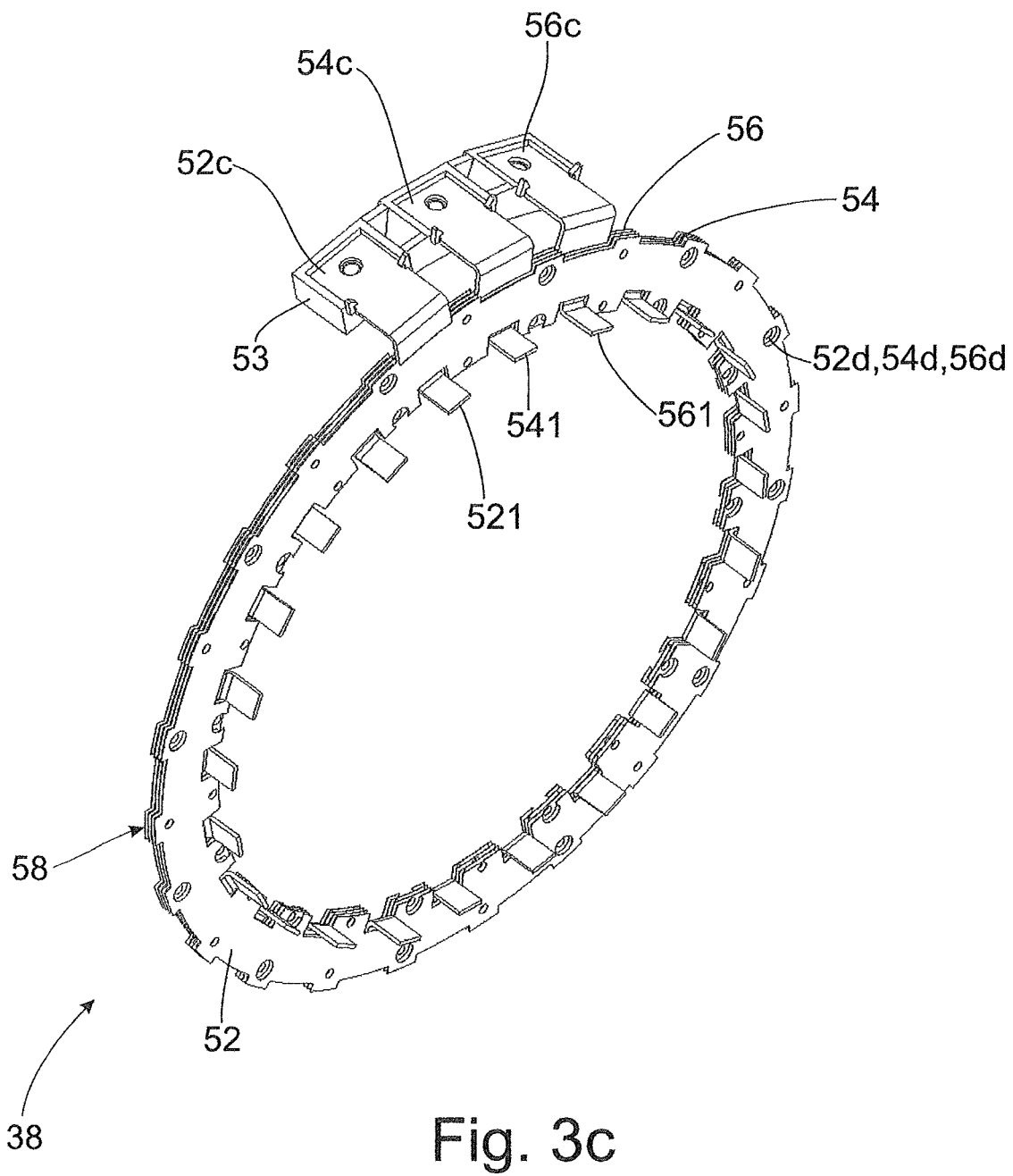
Figure 3D:
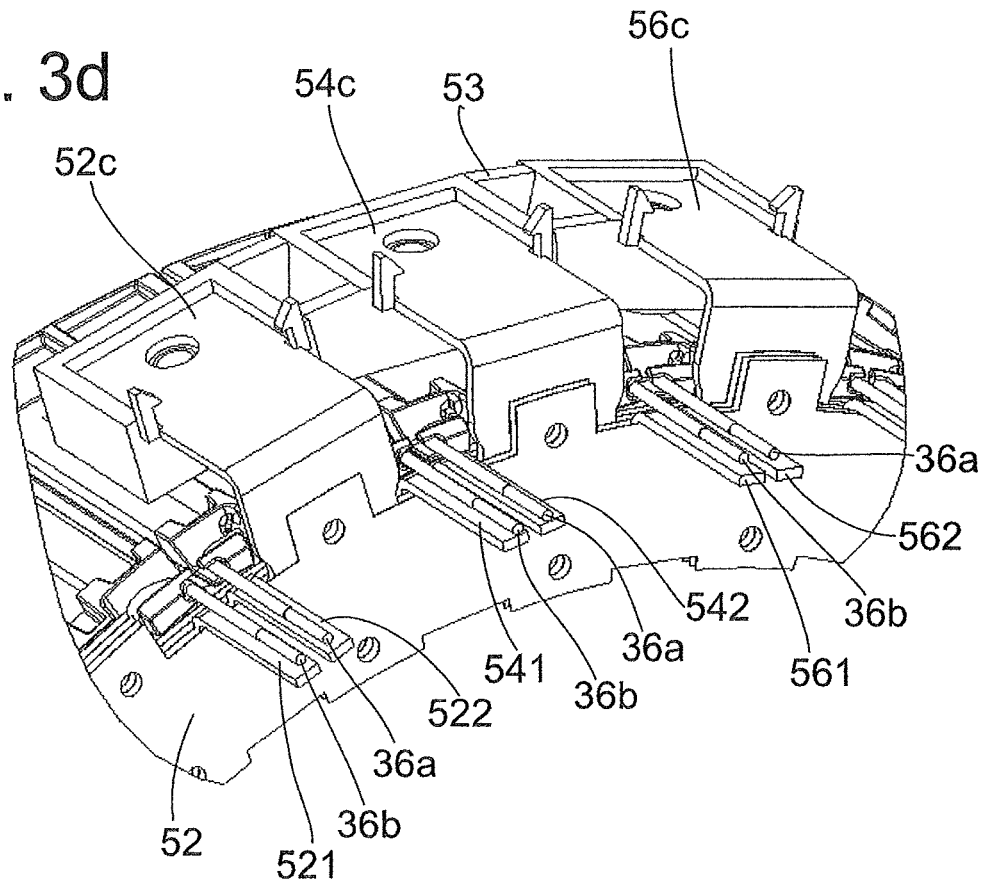
Figure 3E:
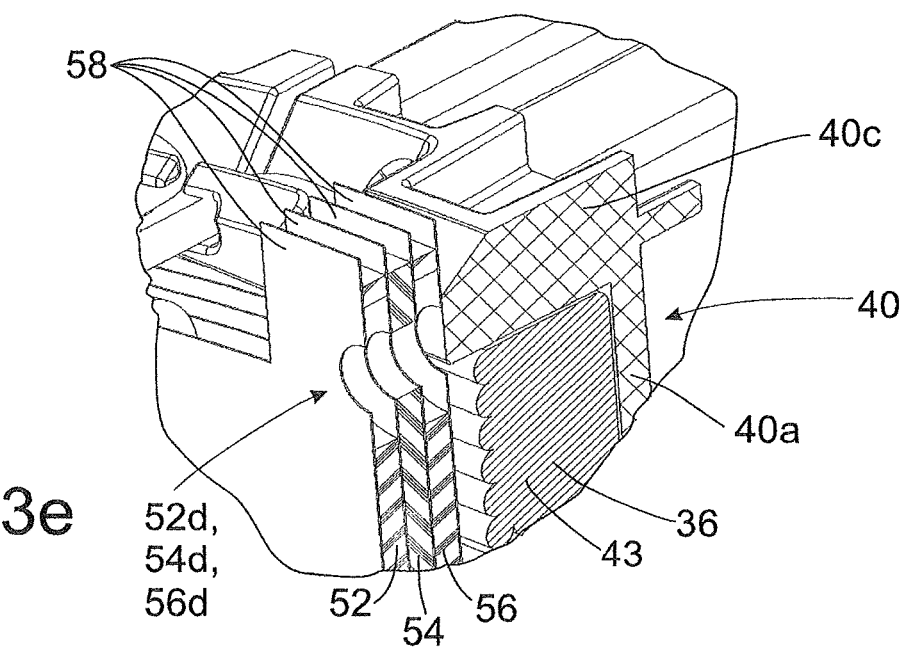
FIG. 3e is a perspective sectional view of the stator from FIG. 3d.
Figure 3F:
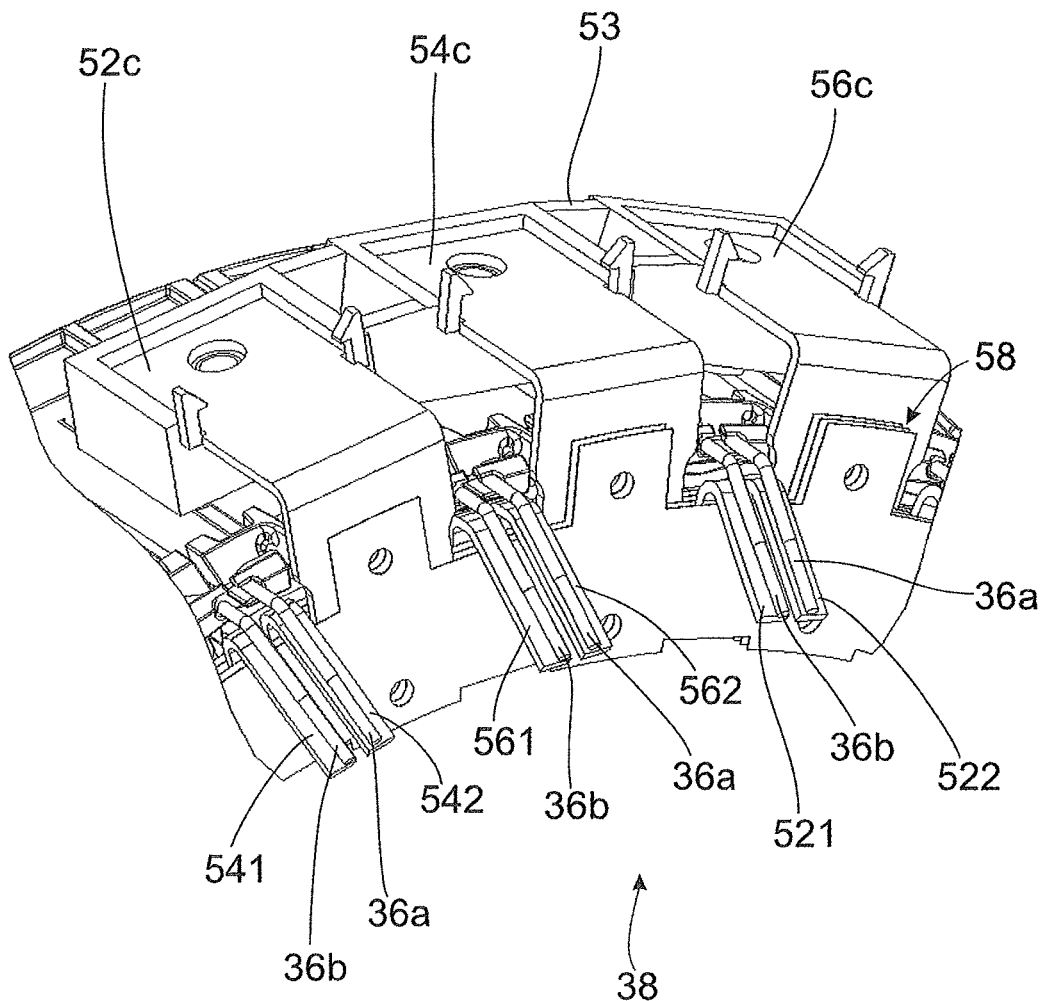
FIG. 3f is a perspective partial view of a stator with an interconnection device from FIG. 3a, but with angled coil connection regions.
Figure 4C:
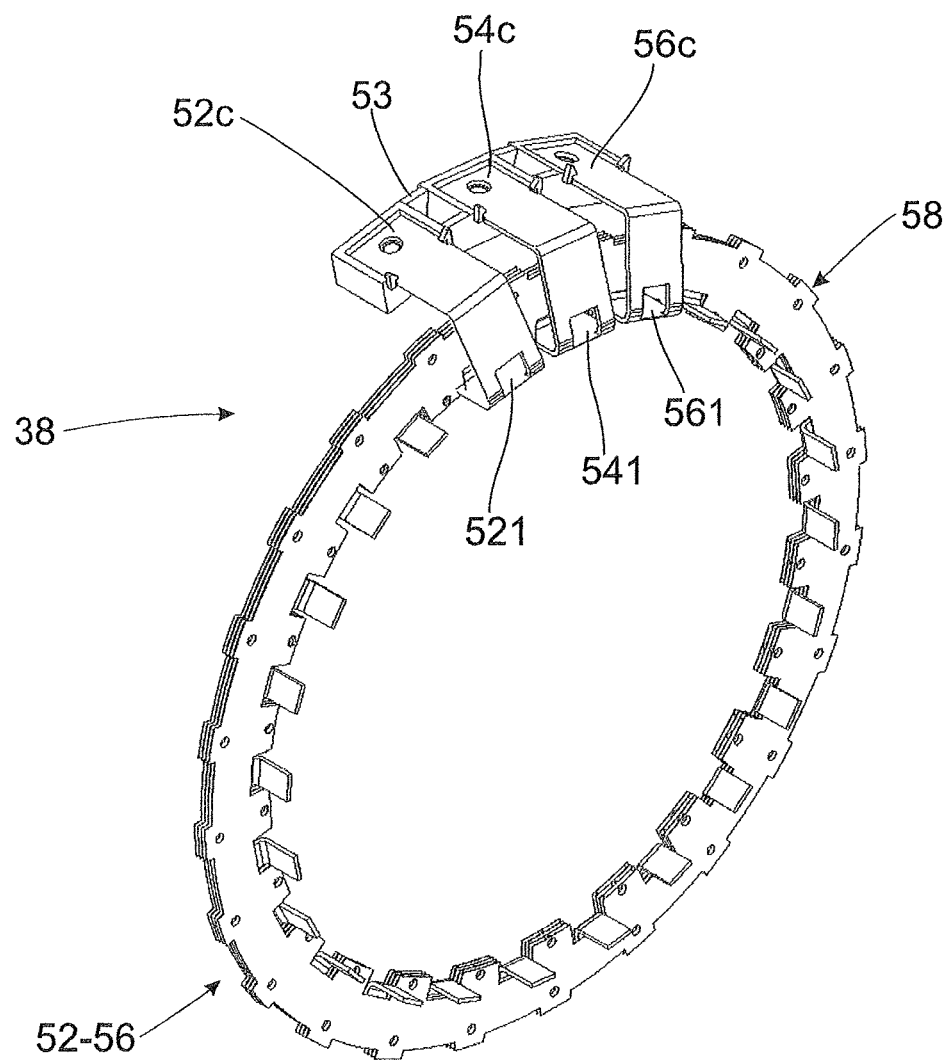

Like objects, functional units or comparable components are designated throughout the figures by like reference numerals. Further, summarizing reference numerals are used for components and objects which occur several times in an embodiment example or in a drawing but which are collectively described with respect to one or more features. Components or objects designated by the same or summarizing reference numerals may be implemented alike but possibly also differently with respect to individual, several or all features, e.g., their dimensioning, insofar as the description does not explicitly or implicitly indicate otherwise. In order to avoid repetition, identical objects, functional units or comparable components in various embodiment examples are not described repeatedly, and only distinctions between embodiment examples are described.

FIG. 1 schematically shows an electric machine 10, more accurately a permanently excited inrunner-type electric synchronous machine, having a rotor 14 that is rotatable around a rotor shaft 12 with a rotational axis A and having a stator 16 that radially outwardly surrounds the rotor 14. Rotor 14 comprises a pot-shaped rotor carrier 18. A rotor lamination stack 20, which carries a plurality of permanent magnets 22 that are spaced apart from one another at the circumference, is arranged on the cylindrical outer circumferential surface of the rotor carrier 18.

Stator 16 comprises an annular stator carrier 24. An annular stator lamination stack 26 which is likewise formed of laminations is arranged in the central recess of the stator carrier 24. Accordingly, the rotational axis A forms the center axis A of the stator at the same time. The stator carrier 24 can be an outer housing or an intermediate housing of the electric machine 10, for example.

Stator lamination stack 26 comprises an annular stator yoke 30 contacting the stator carrier 24 and teeth 32 that project radially inward from the latter and which is outfitted to form a stator winding with a plurality of stator coils 36. These stator coils 36 are wound from a copper wire around the teeth 32 by means of two insulating or winding bodies 40, 42 made of a heat-resistant plastic and are prevented from slipping at the teeth 32. The winding bodies 40, 42 comprise in each instance a base region or winding carrier 40a; 42a contacting the front of the lamination stack 26 and two legs 40b, c; 42b, c which project approximately at right angles therefrom and axially at the stator 16 and which limit a winding area 43 in radial direction.

The coils 36 are associated with electrically discrete strands, for which purpose the coil ends 36a, b are connected to one another in a predefined manner by an interconnection device 38 which is only shown schematically in FIG. 1.

To this end, as can be seen from the following FIGS. 2-5, the interconnection device 38 comprises a plurality of connection conductors 52, 54, 56 that are insulated from one another by insulating layers 58 and that have coil connection regions 521; 541, 561 spaced apart circumferentially for contacting the coil ends 36a, b. In all of the embodiment examples described herein, the interconnection device 38 is fixed to the winding bodies 40 with the connection conductors 52, 54, 56 as will be explained in detail and as can be seen from the further figures.

The interconnection device 38 is further connected via power connection regions 52c, 54c, 56c of the connection conductors 52, 54, 56 to power electronics 39a and control electronics 39b with an electric energy source 39c which can apply current to the winding in variable phase and amplitude for operating the electric machine 10. The power connection regions 52c, 54c, 56c are inserted in a socket 53 so as to be electrically insulated collectively and mutually in order to form a power connection or terminal point.

In the present case, the connection conductors 52, 54, 56 are produced as annular disks from a semifinished copper product, in particular a copper plate or copper lamination, by a stamping process. The annular disks are arranged at the stator 16 coaxial to the center axis A and stacked axially with respect to one another with the interposed insulating layers 58 and with two further insulating layers 58 covering the end faces or plane surfaces.

The coil connection regions 521, 541; 561 are initially formed as radial extensions at the annular disk-shaped connection conductors 52, 54, 56 and then angled axially at the stator 16 relative to a plane defined by an annular disk. The coil connection regions 521, 541; 561 are arranged at the stator 16 for interconnection parallel to and adjacent to the coil ends which are likewise axially oriented.

Figure 5:
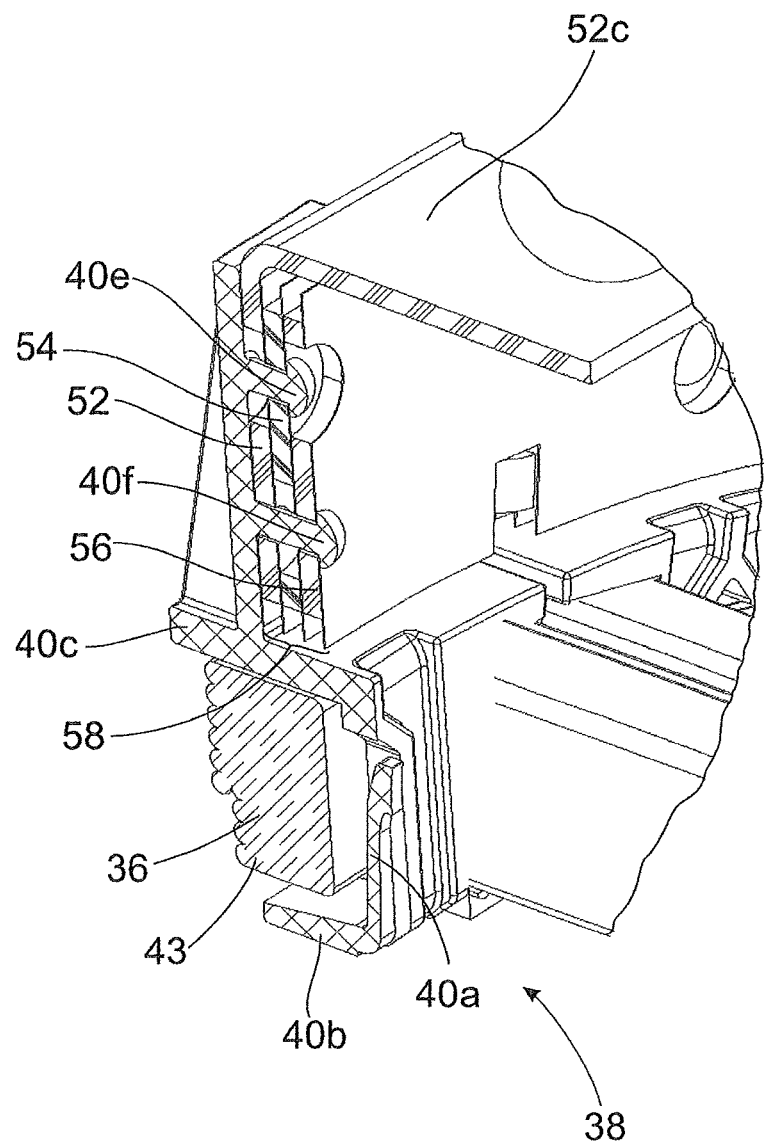
FIG. 5 is a perspective partial view of an interconnection device with connection conductors which are arranged radially with respect to a coil winding area.

The coil connection regions 521, 541, 561 are formed at the radially inner circumferential area of the connection conductors 52, 54, 56 according to FIGS. 2-4 and at the radially outer circumferential area of the connection conductors 52, 54, 56 in FIG. 5, although this is concealed in the depicted view and is therefore not visible.

All of the figures show that the connection conductors 52, 54, 56 are secured to the stator 16 in an axially staggered manner, and the axially bent coil connection regions 521, 541, 561 are arranged substantially on a common pitch circle and at the same axial height.

In the depicted embodiment examples, the interconnection of the coil ends 36a, b is shown with three connection conductors 52, 54, 56, respectively, for realizing a delta connection. Further, two adjacent coil ends 36a, b of two circumferentially adjacent coils 36 are also connected to coil connection regions 521, 541, 561 of one of the connection conductors 52, 54, 56, which coil connection regions 521, 541, 561 are directly adjacent to one another. These coil connection regions 521, 522; 541, 542; 561, 562 which are associated with a connection conductor 52, 54, 56 and configured in pairs are spatially separated, for example in FIGS. 2a-e, by an axial slit. In the embodiment examples in FIGS. 3a-f and FIGS. 4a-c, in contrast, they are constructed as one individual materially and spatially contiguous connection region 521, 541, 561. Both of these variants represent possible alternatives for all of the embodiment examples discussed herein. Recesses 52b, 54b, 56b are provided in each instance at a connection conductor 52, 54, 56 at the regions extending in circumferential direction between the coil connection regions. The coil connection regions 521, 541, 561 of the two further connection conductors 52, 54, 56 are guided axially through these recesses 52b, 54b, 54b. These recesses are labeled in FIGS. 2a, 3a, for example.

The coil ends 36a, b are contacted with the connection conductors 52, 54, 56 by bonding, particularly by soldering or welding. As can be seen from FIG. 3f, the coil connection regions 521, 522, 541, 542, 561, 562 with the coil ends 36a, b are bent radially inward out of the axial direction, which can be carried out before or after contacting.

A plurality of fastening portions in the form of recesses 52d, 54d, 56d are provided at the connection conductors 52,

54, 56 so as to be distributed in circumferential direction for fastening to the two legs 40b, c of the winding bodies 40. Formed at the legs 40b, c corresponding to this circumferential distribution are connection regions in the form of axially protruding pins 40e, f that receive the axially stacked connection conductors 52, 54, 56 and which fix the latter in position, for example, by subsequent heat staking or another joining technique, possibly with the inclusion of further connection elements. Accordingly, it will be seen that the fastening portions 52d, 54d, 56d of the connection conductors 52-56 are arranged in an axially overlapping manner and that the connection conductors 52, 54, 56 are secured together with these fastening portions to a connection region 40e, f of a winding body 40 in each instance. In FIGS. 2-4, the connection conductors 52, 54, 56 are arranged axially with respect to a winding area 43 and provided for this purpose, whereas the connection conductors 52, 54, 56 in the embodiment example in FIG. 5 are located radially outwardly of a winding area 43.

In the embodiment examples, the insulating layers 58 which have already been mentioned are formed as a self-adhesive insulating paper or as a self-adhesive insulating foil and in particular as a double-sided adhesive Kapton foil.

Alternatively, the connection conductors 52, 54, 56 can also be coated with a plastic that covers the two end faces and the radially inner and outer circumferential surface of a connection conductor to form the insulating layer.

In FIGS. 2a-e, the three connection conductors 52-56 are formed with a different inner diameter and a different outer diameter which increase in direction of the coils 36 so as to increase an effective air gap and creepage distance. Accordingly, it will be appreciated that the respective inner edge areas and outer edge areas of two respective adjacent connection conductors 52-56 radially overlap one another. The insulating layers 58 arranged between two adjacent connection conductors 52-56 in each instance extend along the entire radial extension of the two connection conductors adjacent thereto.

In contrast, adjacent connection conductors 52-56 in FIGS. 3-5 are formed with a radially corresponding extension, and an insulating layer 58 arranged between each two connection conductors 52-56 extends past a radially inner edge area and past a radially outer edge area of these connection conductors.

The power connection regions 52c, 54c, 56c mentioned with reference to FIG. 1 are also formed as radial extensions proceeding from the annular base body and have a larger effective electrical cross section compared with the coil connection regions 52l, 54l, 56l. These extensions are formed at connection conductors 52, 54, 56 radially outwardly in FIGS. 2, 3, and 5 and radially inwardly in FIG. 4. In the latter case, the power connection regions 52c, 54c, 56c simultaneously form coil connection regions 52l, 54l, 56l. For contacting the respective coil connection region 52l, 54l, 56l, an access window 52e, 54e, 56e through which a tool, particularly a soldering iron, can be inserted is provided at this position at the power connection regions 52c, 54c, 56c. Power connection regions of this kind can also be provided at interconnection devices with radially overlapping connection conductors 52, 54, 56 according to FIGS. 2a-e. If required, the power connection regions 52c, 54c, 56c protruding integrally from the connection conductors, 52, 54, 56 can also be connected to further conductor elements and consequently lengthened.

To protect the mutual contact points of the coil connection regions and coil ends, the stator of the electric machine can be provided with a coating, for example, a powder coating, a lacquer coating or with a silicon coating, at least in the region of the interconnection device.

Of course, the subject matter of the invention is not limited to stators of permanently excited electric machines, but can be transferred to other types of electric machines and stators thereof beyond the embodiment examples mentioned herein.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A stator of an electric machine comprising:
a quantity of stator coils with coil ends;
insulating layers;
an annular stator lamination stack at which the quantity of stator coils with coil ends is arranged;
a plurality of connection conductors constructed as annular disks and are arranged in an axially staggered manner at the stator and having coil connection regions for the coil ends and power connection regions for supplying power to the electric machine;
an interconnection device for the quantity of stator coils which is arranged at the stator lamination stack on a front side, wherein the interconnection device has the plurality of connection conductors arranged coaxial to one another and which are electrically insulated from one another by the insulating layers; and
at least one fastening portion for each connection conductor configured to fasten each connection conductor to the stator, wherein the fastening portions of the connection conductors are arranged so as to overlap one another; and
a winding body has at least one connection area, wherein the connection conductors are fastened along with these fastening portions to a connection area of the winding body.

2. The stator according to claim 1, wherein the winding body has a winding area which is formed by a winding carrier and two legs that define the winding area in axial direction and are connected to the winding carrier, wherein the connection area is formed at a leg, and wherein the connection conductors are arranged axially or radially with respect to the winding area.

3. The stator according to claim 1, wherein respective insulating layers are formed as self-adhesive insulating paper or self-adhesive insulating foil.

4. The stator according to claim 1, wherein the connection conductors are coated with a plastic which covers the two end faces and at least one radially inner or outer circumferential surface of a connection conductor to form the insulating layer.

5. The stator according to claim 1, wherein two adjacent connection conductors are arranged so as to radially overlap one another.

6. The stator according to claim 5, wherein a respective insulating layer is arranged between adjacent connection conductors and extends along the entire radial extension of the adjacent connection conductors.

7. The stator according to claim 1, wherein adjacent connection conductors are formed with a radially corresponding extension, and a respective insulating layer is arranged between the adjacent connection conductors and extends beyond a radially inner and/or radially outer edge area of the connection conductors.

8. The stator according to claim 1, wherein the coil connection regions of the connection conductors are formed as radially inwardly or outwardly projecting extensions that are axially bent for connecting the stator to the connection conductors and which are arranged parallel to and adjacent to axially oriented coil ends.

9. The stator according to claim 1, wherein a recess is provided at a connection conductor, and a coil connection region of a further connection conductor is guided axially through this recess.

10. The stator according to claim 1, wherein the coil ends are arranged at a common axial and radial position, wherein two circumferentially adjacent coil ends, wherein each of two coils is associated with one and the same connection conductor.

11. The stator according to claim 10, wherein the coil connection regions of two coils are constructed to be spatially separated from one another.

12. The stator according to claim 1, wherein a power connection region is formed at a connection conductor as a radially inwardly projecting extension.

13. The stator according to claim 12, wherein the radially inwardly projecting extension simultaneously forms a coil connection region.

14. The stator according to claim 13, wherein the power connection region has an access window configured to connect a coil end to the coil connection region.

15. An electric machine comprising:
a rotor; and
a stator, wherein the stator comprises:
a quantity of stator coils with coil ends;
insulating layers;
an annular stator lamination stack at which the quantity of stator coils with coil ends is arranged;
a plurality of connection conductors constructed as annular disks and are arranged in an axially staggered manner at the stator and having coil connection regions for the coil ends and power connection regions for supplying power to the electric machine;
an interconnection device for the quantity of stator coils which is arranged at the stator lamination stack on a front side, wherein the interconnection device has the plurality of connection conductors arranged coaxial to one another and which are electrically insulated from one another by the insulating layers;
at least one fastening portion for each connection conductor configured to fasten each connection conductor to the stator, wherein the fastening portions of the connection conductors are arranged so as to overlap one another; and
a winding body has at least one connection area, wherein the connection conductors are fastened along with these fastening portions to the connection area of the winding body.

* * * * *